US00RE45253E

(19) United States
(12) Reissued Patent
Lahn

(10) Patent Number: US RE45,253 E
(45) Date of Reissued Patent: Nov. 18, 2014

(54) REMOTE IMAGE MANAGEMENT SYSTEM (RIMS)

(76) Inventor: Richard T. Lahn, Zimmerman, MN (US)

(21) Appl. No.: 11/888,302

(22) Filed: Jul. 31, 2007

Related U.S. Patent Documents

Reissue of:
(64) Patent No.: 6,925,382
Issued: Aug. 2, 2005
Appl. No.: 09/982,049
Filed: Oct. 16, 2001

U.S. Applications:
(60) Provisional application No. 60/240,041, filed on Oct. 16, 2000.

(51) Int. Cl.
*G01C 21/00* (2006.01)

(52) U.S. Cl.
USPC ..... 701/514; 342/25 A; 700/90

(58) Field of Classification Search
CPC ..... G05D 1/0231; G05D 1/0257; G01S 13/89
USPC ..... 342/25 A; 382/103, 106; 701/90, 223, 701/514; 348/144; 700/90
See application file for complete search history.

(56) References Cited

U.S. PATENT DOCUMENTS

| | | | | |
|---|---|---|---|---|
| 5,485,384 | A * | 1/1996 | Falconnet | 701/207 |
| 5,604,534 | A * | 2/1997 | Hedges et al. | 348/144 |
| 5,719,773 | A * | 2/1998 | Choate | 701/223 |
| 6,130,705 | A * | 10/2000 | Lareau et al. | 348/144 |
| 2002/0085094 | A1 * | 7/2002 | Teuchert | 348/144 |

* cited by examiner

*Primary Examiner* — Rob Swiatek
(74) *Attorney, Agent, or Firm* — Felix J. Sahlin

(57) ABSTRACT

A data processing system is which enables an operator to rapidly perform object detection, identification, recognition, and location using remote imagery from Mini Unmanned Air Vehicles when sensor performance is severely limited due to size, weight, and power constraints. The system receives down linked images from an Unmanned Air Vehicle as well as vehicle geographic position and sensor attitude data. The imagery is processed on the ground using detection, identification, recognition and moving target detection algorithms to eliminate clutter and preselect potential objects of interest. The objects of interest are identified by the operator from the preselected list of objects automatically presented to him. The target location is simultaneously calculated for selected objects using the down linked vehicle location and sensor pointing angle and displayed to the operator.

15 Claims, 4 Drawing Sheets

REMOTE IMAGE MANAGEMENT SYSTEM (RIMS)

Matter enclosed in heavy brackets [ ] appears in the original patent but forms no part of this reissue specification; matter printed in italics indicates the additions made by reissue.

CROSS REFERENCE TO RELATED APPLICATIONS

This Application claims the benefit of U.S. Provisional Application No. 60/240,041, filed Oct. 16, 2000.

STATEMENT CONCERNING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of Invention

The present invention generally relates to object detection, recognition and location systems where sensor performance is severely limited due to size, weight and power constraints.

2. Background of the Invention

Current aerial surveillance and targeting systems are subject to the same fundamental design constraints: 1) Use of IR detection sensors for night-time and all weather capability; 2) some form of gimbaling mechanism to reorient the position of the sensor either to seek out new objects or to maintain the line of sight of the sensor relative to the object of interest while compensating for the forward motion of the airborne platform or movement of the object itself; 3) stabilization to isolate the sensor from vibration, pitch, yaw and roll motions as well as air turbulence.

Uncooled IR sensors possess approximately ten percent of the sensitivity to light of a normal day light television camera. Sensitivity limitations ultimately affect the quality and the detail of the images which may be obtained. Current approaches compensate for this limitation by using multiple sensors arranged in arrays and by cooling the head of the IR detector to make it more sensitive to IR radiation. These approaches trade increased sensitivity at the cost of increased size and weight.

The prime example of this is the Forward Looking Infra-Red or FLIR. A FLIR design usually contains other features: a laser range finder, a day time light television camera, optics to integrate, amplify and clarify images from the optical detectors, a means to track and gimbol the FLIR to objects of interest and a means to stabilize the unit from the platform's engine vibrations, changes in attitude due to aerial maneuvering and buffeting due to air turbulence. FLIRS are neither particularly miniature or light weight. One of the smallest commercially available FLIRs, the Microstar® manufactured by the FLIR Systems Company is 34.3 centimeters high and weighs 11.6 kilograms.

Existing airborne detection and targeting systems whether manned or unmanned also require the intervention of a trained operator to direct a gimbaled sensor to the area of interest, detect and identify the objects of interest, determine their location, and communicate the information to a ground based command post for processing and decision making. This human data processing takes place in real time. Support for this mission usually requires a helicopter or fixed wing aircraft and two people—a pilot and sensor system operator or an unmanned air vehicle (UAV).

UAVs though unmanned, fall into the size range of manned aircraft. For example the General Atomics Predator® has a length of 8.7 meters and a wingspan exceeding 15.5 meters. The smaller, General Atomics Prowler has a length of 4.9 meters and a wingspan of 7.74 meters. These planes are capable of carrying payloads in the range of 130 to 220 kilogram and remaining aloft for more than 24 hours.

These systems, whether manned or unmanned, require highly trained personnel, are expensive to operate, and at times put the human operators in harms way. In addition, they require complex logistics systems to service, maintain and support the sensor, the airframe which carries it, and the air crew. In the case of UAVs, this includes a ground control station capable of controlling the UAV, directing the sensor, and receiving transmitted images in real time.

By contrast a MUAV is lighter, 4.5 kilograms or less, has much lower capital, and operating costs than a conventional aircraft or UAV. It does not require a launch pad or airport, and can be carried in a car for instant deployment when needed. Like UAVs, it does not put its operators in harms way for dangerous missions. MUAV surveillance systems are however, severely constrained by their own weight, size, and power limitations. By way of context, the Microstar® FLIR mentioned above is more than twice the weight of a MUAV.

In turn, MUAVs tactical capabilities are limited due to the performance of existing state of the art technology for small, light-weight night vision, infrared (IR) sensors. To meet weight requirements, Single not arrays of IR sensors must be employed. The sensor must be uncooled because use of a cryostatic device to cool the sensor would impose unacceptable power and weight requirements. Today's state of the art uncooled sensors have limited resolution, requiring a narrow field of view (FOV) in the range of 15 degrees or a telephoto lens to resolve ground objects. In addition, weight and power limitations of an MUAV preclude the use of a three axis, stabilized, gimbaled platform to direct the sensor.

The use of a fixed, narrow FOV sensor imposes several limitations on the system which inhibit its ability to effectively perform its mission. The operator must be able to recognize the objects in the FOV of the sensor to discern targets of interest from non targets and differentiate "friend" from "foe". At the 35 mile per hour baseline speed of current MUAV's, the operator will experience a "Soda Straw" effect similar to that experienced in looking out the side of a fast moving vehicle with a pair of powerful binoculars. Objects do not remain in the field of view long enough for the operator to recognize objects. To illustrate this limitation, an MUAV equipped with a representative state of the art uncooled IR sensor with a field of view (FOV) of 15 degrees, flying at 60 kilometers per hour (17 meters per second) at an altitude of 100 meters would have an effective visual area of less than 50 meters in diameter. The time required for a human operator to recognise an object within the FOV is 5 to 9 seconds. Given these parameters, the maximum time an object would be in the FOV is 3 seconds, less if it is not located along the diameter of the FOV. In either case there is insufficient time in the FOV for operator recognition.

Often, the mission is to search an area for potential objects where no prior information is known about approximate location of objects of interest. The vehicle is then forced to fly a search pattern. The time required to search even a small area is excessive if the MUAV is forced to fly at speeds slow enough to enable the operator to recognize targets because of the narrow sensor footprint over the ground. Using the speed, altitude and FOV values of the previous example, and assuming that the time to execute a 180 degree turn is 30 seconds, the search time for a 10 square kilometer area would be almost 5 hours at speeds where imagery is barely recognizable or non-recognizable to the operator.

Once an object of interest is identified, it is desirable to loiter over its location and observe. A circular loiter pattern is not feasible with a fixed camera because the bank angle of the aircraft would be greater than 15 degrees. With a FOV of 15 degrees and an altitude of 160 meters, the resulting visual footprint of the state of the art uncooled IR sensor is approximately 80 meters. The object can be observed with a racetrack or figure eight pattern, but these patterns allow the object to be within the FOV for only approximately 5% of the time in a typical holding pattern.

Use of an on-board laser range finder is not possible because of payload weight constraints of MAUVs. Current systems employed on MAUVs therefore determine the target location using the Global Positioning System coordinates of the air vehicle and an algorithm which triangulates the location of the object of interest using altitude and the LOS angle from vertical These algorithms assume that the terrain is flat. Significant errors can be introduced in the situation where the terrain is in fact mountainous or hilly.

SUMMARY OF THE INVENTION

The Remote Image Management System (RIMS) described herein eliminates the need for manned aircraft, airborne personnel, and their expensive support systems. One of its key attributes is that it is small and simple enough to permit the use of a Mini Unmanned Air Vehicle (MUAV) weighing less than 4.5 kilograms.

The invention includes of both airborne and ground based elements. The airborne element includes of a device capable of slewing the sensor line of sight (LOS), a sensor capable of gathering imagery of ground based objects, a communication link between the air vehicle and the Ground Control Unit (GCU), and a Flight Management System (FMS) capable of determining the air vehicle location and controlling the airborne processes relating to the control of the sensor LOS, the communication link, and the air vehicle flight path and attitude.

The ground based element is an operator's GCU including radio transmitters and receivers comprisng a communication link between the GCU and the air vehicle, an image processing unit, comprised of a single or multiple CPUs and a display and control interface with the operator. In operation, the sensor LOS is directed to an area of interest by either automatic control of the FMS or by the ground operator. Its imagery is down linked to the GCU along with data containing the air vehicle location and sensor pointing angle. The GCU data link receives the imagery and data and routes it to the image management system. The image management system processes the imagery to eliminate the clutter of false targets by performing detection, identification, recognition and moving target detection algorithms. The purpose for performing these algorithms is to identify potential objects of interest by eliminating non targets. These objects of interest are highlighted and displayed to the operator thus reducing the operator workload and enabling him to concentrate only on potential targets. This reduction of workload permits the operator to find targets in real or near real time more readily than if he were forced to review the entire scene unaided and eliminate the clutter objects himself.

Once an object of interest has been selected, the operator can interface with the control panel on the GCU and the target location is noted by performing calculations in the GCU more fully described herein.

DESCRIPTION OF THE PREFERRED EMBODIMENT OF THE INVENTION

Figure 1:
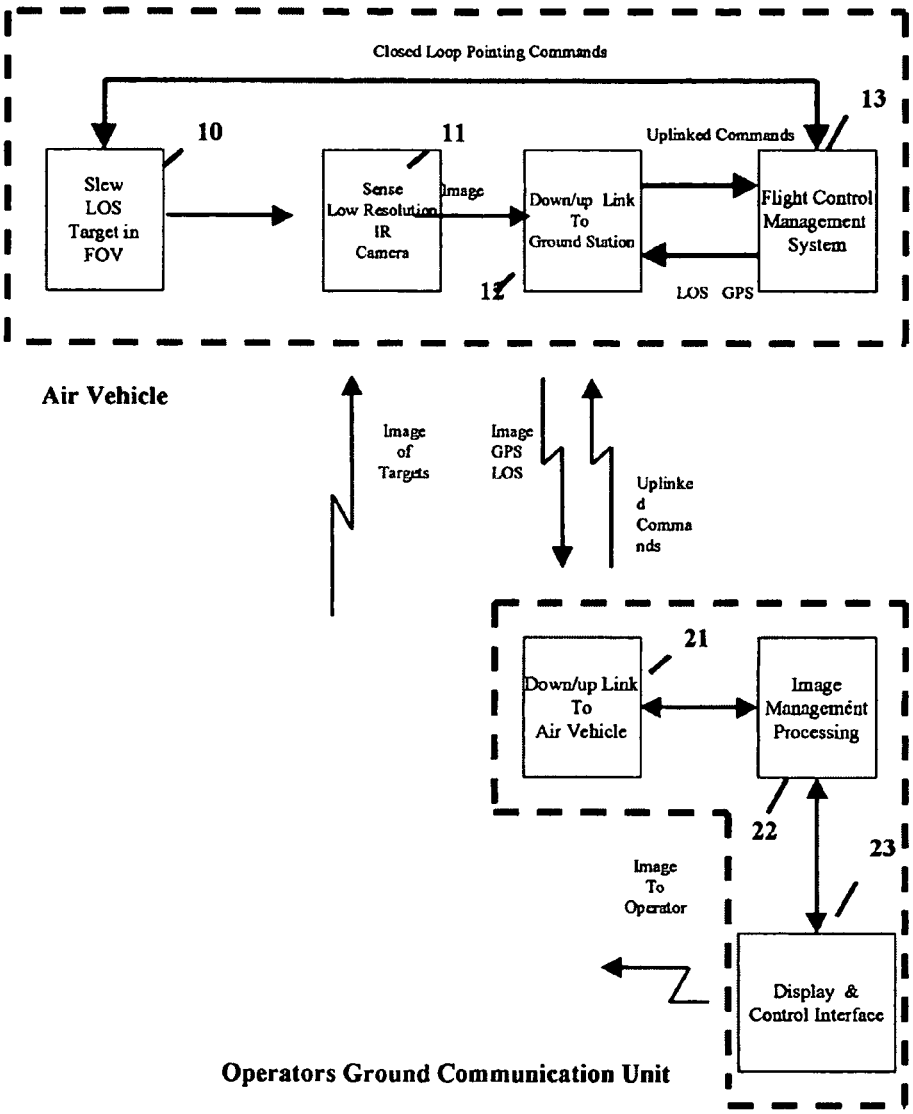
FIG. 1 is a block diagram of the Remote Imaging Management System.
Figure 2:
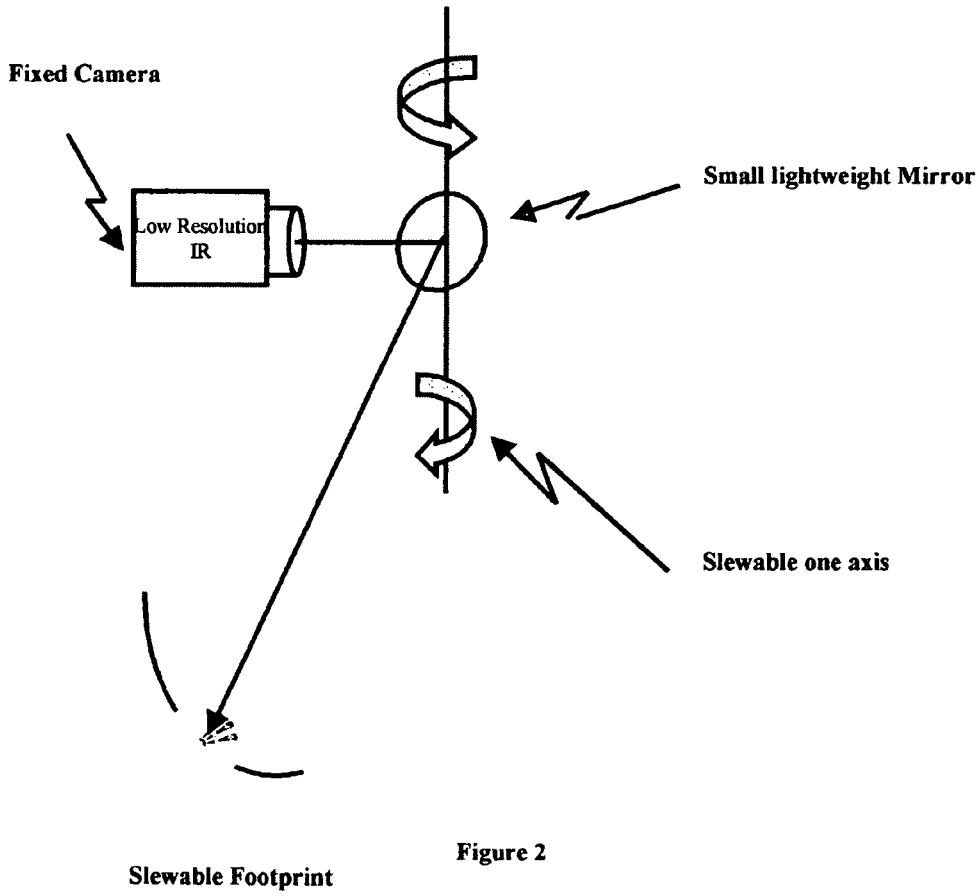
FIG. 2 depicts the LOS Slew Device, 10

Referring to FIG. 1, System Block Diagram, LOS slew device, 10 is a lightweight device which enables the Line of Sight of the sensor to be directed to an area of interest. This device may consist of a lightweight mirror rotatable on a single axis or a 3 axis tilt and pan mechanism. The control of the LOS slew device may be either automatic through preprogrammed direction from the FMS 13 or by control of the operator on the ground. LOS slew device is described in more detail in FIG. 2. Slewing of the LOS, can be accomplished using the single axis mirror technique shown in FIG. 2. A 3 axis pan and tilt mechanism may also be employed. A stabilized 3 axis gimbal mechanisms are generally too heavy to be accommodated in a MUAV.

The LOS sensor 10, will be coupled with the aircraft attitude in pitch, yaw, and roll (which is under control of the Flight Management system) to provide a LOS pointing capability of a three axis gimbal with the cost, power, and weight savings of a single axis slewable mirror. Coupling with the Flight Management System also will provide greater LOS stability in turbulent air. Pilot and passenger discomfort due to unusual aircraft attitudes is eliminated because the vehicle is unmanned. This innovation will also provide the capability to slew the LOS from side to side while traversing a ground track, thus significantly increasing the area under surveillance. Allowing the MUAV to fly faster through the use of ground based image management and with a wider footprint obtained by employing a slewable LOS mirror significantly reduces the time to search a 4 square mile area from about 5 hours to about 30 minutes.

The camera 11 generates the imagery which is transmitted to the Ground Control Unit for interpretation by the operator. For night, an IR camera is required. However any device which is capable of providing imagery can be employed at other times for example, Daytime TV, Low Light Level TV. Synthetic Aperture Radar may also be employed as an alternative image detection mechanism.

The Flight Management System 13 manages and controls the processes onboard the air vehicle.

It is preprogrammed on the ground using the GCU, but is also capable of being reprogrammed enroute at the operators discretion. The FMS 13 directs the air vehicle to fly to certain locations and direct the LOS slewing device to predetermined areas of interest. It also computes the vehicle location using an Inertial Measurement Unit (IMU) or Global Positioning System (GPS).

The sensor imagery, air vehicle location, and sensor pointing angle, singularly and collectively referred to as image data are communicated to the Ground Control Unit via a transceiver 12 located in the air vehicle. Alternatively, determination of Global Position may be carried out onboard the aircraft and the resulting position data communicated to the Ground Control Unit (GCU) in a like manner. Geographic position and object image data are synchronized. For these purposes the events are considered to be synchronized if geographic position calculations and object image frames are generated within 80 milliseconds of each other.

The imagery and data are received on the ground with a transceiver 21 similar to that located in the air vehicle. The imagery and data are routed to the image management processing unit 22 located in the GCU.

Figure 3:
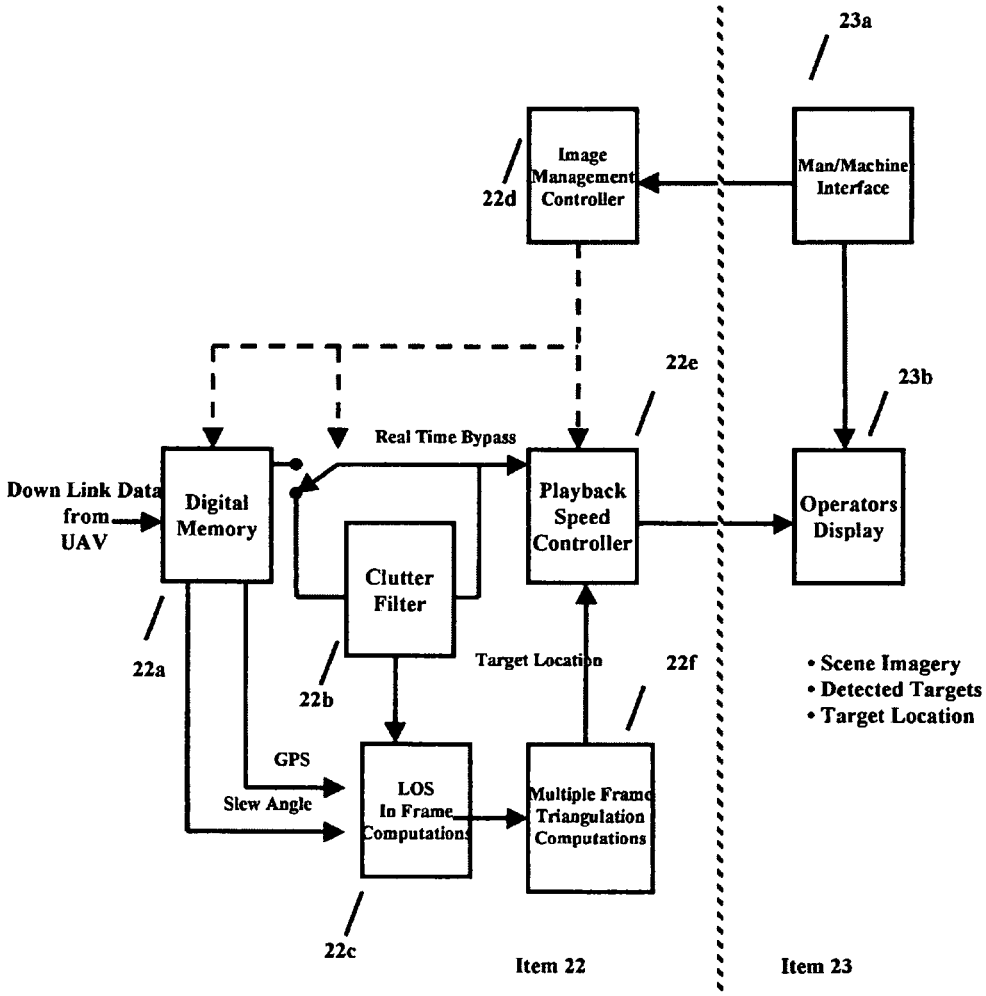
FIG. 3 is a block diagram of the Image Management Architecture.

FIG. 3 depicts a preferred embodiment of the Image Processing Architecture 22. The image management processing unit's function is to preprocess the imagery, eliminate unwanted clutter objects from consideration, and identify potential targets of interest for operator consideration. Several algorithms exist for this function which are familiar to those skilled in the art. Such algorithms include but are not limited to: Target detection, Target identification, Target recognition, Moving Target detection, Mosaic imaging techniques, Differencing (from last survey) identification. These algorithms are operator selectable depending on the mission and not all would be employed simultaneously at a given time. The objective of these algorithms is to reduce the number of objects for operator consideration, thus reducing his workload and enabling him to access object and evaluate image information in real or near real time The processed image is displayed to the operator on the Display and Control Interface 23. Objects of interest are visually highlighted for his consideration. An operator interface is provided to enable selection of those objects for which the operator wants to determine their location. The interface may also be configured to immediately alert the operator of the presence of objects of interest.

Figure 4:
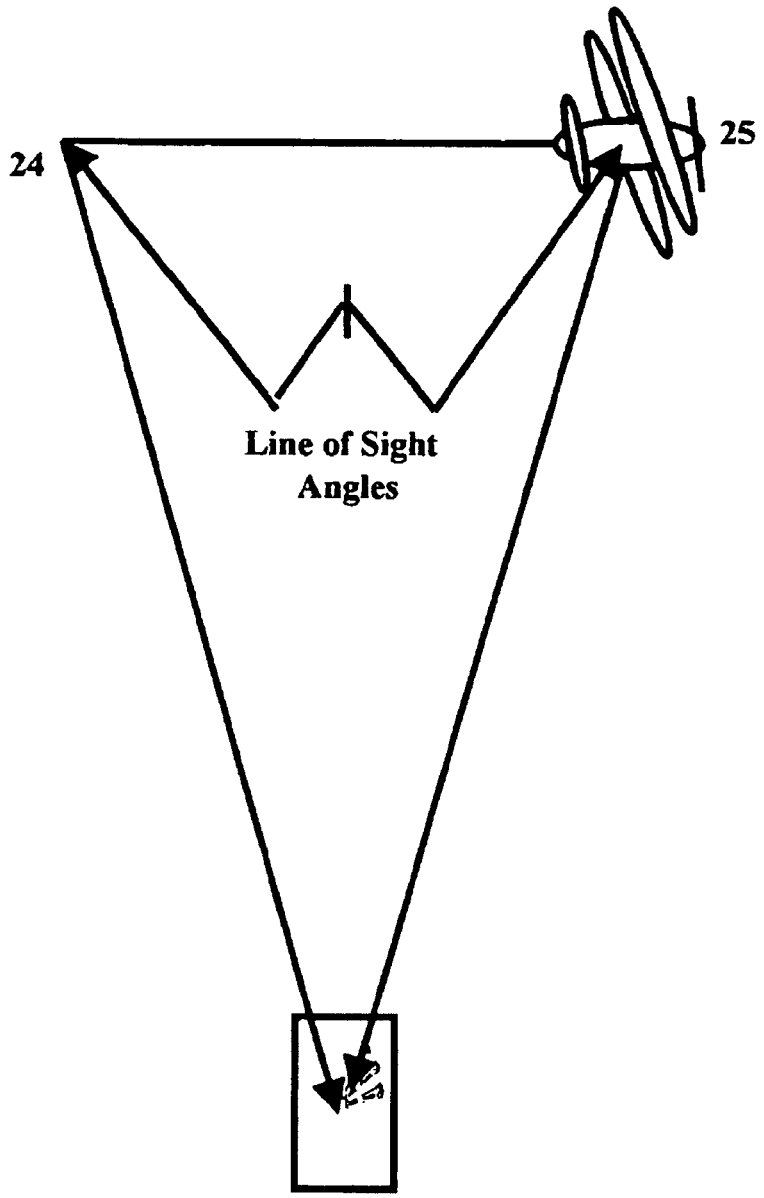
FIG. 4 describes the methodology for computing target location using triangulation.

FIG. 4 demonstrates a means for calculating Target Location using Multiple Frame Triangulation and eliminating the need for laser ranging. Multiple Frame Triangulation uses the distance traveled from 24 to 25 and LOS angle information obtained from multiple frame sightings to triangulate the object's position. An algorithm is employed which uses the distance traveled between sightings as the base of the triangle formed between two LOS angles obtained from two sightings to obtain an estimate of the objects geographic position. Multiple frames can be averaged and filtered to obtain accurate locations independent of terrain variations.

Downlinked data from the MUAV is received in the communication link 21 and routed to the digital memory 22a. The digital memory serves as the repository for the image and data and serves as a buffer to eliminate timing problems due to delays encountered in the processing of the imagery.

The Clutter Filter 22b contains the algorithms, previously described which serve to eliminate non targets from targets of interest. Note that this filter can be bypassed should the operator wish to view the imagery without filtering. Objects of interest are flagged by the Clutter filter 22b for highlighting on the operator's display 23b and noted in the LOS In Frame Computations module 22c.

The In Frame Computations module 22c functions to locate the flagged object in the image field of view and compute the objects line of sight direction with respect to the air vehicle coordinate reference frame. The LOS data are routed to the Multiple Frame Triangulation Computations module 22f for further processing.

The Multiple Frame Triangulation Computation module 22f uses the technique diagrammed in FIG. 4 to accurately determine the objects location on the earth without the need for laser ranging. Multiple Frame Triangulation uses the distance traveled and LOS angle information obtained from multiple frame sightings to triangulate the object's position. The algorithm uses the distance traveled between sightings as the base of the triangle formed between two LOS angles obtained from multiple sightings. Multiple frames can be averaged and filtered to obtain accurate locations independent of terrain variations.

The operator interfaces with the invention using the man-machine interface 23a. The man machine interface permits the operator to identify objects of interest and control the GCU functions. The interface may also be programmed to immediately alert the human operator to the presence of an object. This feature may be employed when the mission is airfield perimeter defense and one or several MUAVs fly the perimeter and notify the operator when objects are detected. The interface can also allow the human operator to select an object of interest and redirect the sensor to the object's location by returning the MAUV to the area and manipulating the sensor's LOS. Locking onto the object is another variant.

The operator may not be able to process all pre selected objects of interest in real time in a target rich environment. Accordingly, a playback speed controller 22e is provided to permit the operator to slow or fast forward the image display to permit optimal viewing.

Other embodiments are within the following claims.

I claim:

1. A remote image data processing system for use in an aircraft comprising:

a. *an* image sensing means to receive an image of [the] *an* object of interest;

b. means for adjusting the sensing means line of sight (LOS);

c. means for determining and recording a geographical position of the image sensing means;

d. means for determining and recording LOS angle of image data relative to the image sensing means;

e. means for transmitting the image of the object, geographical position of image sensing means and LOS angle of image as data in an electronic format;

f. means for receiving transmitted images, sensor position, and the LOS angle as data;

g. means for storing image, geographic position and LOS angle data in a storing medium;

h. means for processing image data to identify potential objects of interest for subsequent operator review, to determine geographic location of the object and to track location of sensor relative to the object;

k. means to store processed image data;

l. means to retrieve processed images and object's geographic position from storage for display;

m. means to visually display processed image data to human operator*;*

*n. an operator's ground control unit constructed for direct control of the air vehicle by the operator*.

2. A remote image data processing system as claimed in claim 1, wherein the image sensing means is a low resolution infrared sensor.

3. A remote image data processing system as claimed in claim 1, wherein the image sensing means is a video camera.

4. A remote image data processing system as claimed in claim 1, wherein the image sensing means is a synthetic aperture radar.

5. A remote image data processing system as claimed in claim 1, wherein the image sensing means includes a means for resolving images.

6. A remote image data processing system as claimed in claim 5, wherein the means for resolving images is a telephoto lens.

7. A remote image data processing system as claimed in claim 1, wherein the means for adjusting the image sensing means line of sight is a one axis slewable mirror.

8. A remote image data processing system as claimed in claim 1, wherein the means for adjusting the image sensing means line of sight is a three axis pan and tilt mechanism.

9. A remote image data processing system as claimed in claim 1, wherein the image storing medium allows unfiltered, real time display of image data.

10. A remote image data processing system as claimed in claim 1 wherein the image processing means allows display of image data on a frame by frame basis.

11. A remote image data processing system as claimed in claim 1 wherein the means for processing image data allows means for operator control and adjustment of the speed of visual display of processed image data.

12. A remote image data processing system as claimed in claim 1 wherein the means for processing image data may be bypassed to allow real time review of images and image data by operator.

13. A remote image data processing system as claimed in claim 1, wherein the means for processing image data allows operator to select an object of interest and return the image sensor to the object's location.

14. A remote image data processing system as claimed in claim 1, wherein the means for processing image data alerts the operator when the means for processing image data processor identifies an object of interest.

*15. A remote image data processing system for use with an air vehicle comprising:*

*a. an air vehicle and an operator's ground control unit (GCU); b. said air vehicle incorporating a line of sight (LOS) to receive an image of an object of interest; c. a positioning module with data storage capacity for determining and recording the geographical position of an image sensor; d. a module for determining and recording LOS angle of image data relative to the image sensor; e. a mechanism for adjusting the LOS angle relative to the image sensor; f. a flight management system or ground control unit (GCU) to control the air vehicle in flight; g. said air vehicle, being connected by a radio up/down link capable of transmitting images of the object, geographical position of image sensor and LOS angle of image as data in an electronic data format from the air vehicle to the GCU, said GCU incorporating a radio up and down link being capable of transmitting flight control, LOS adjustment and image processing instructions from an operator to the air vehicle; h. said GCU incorporating an image management unit capable of processing and storing images of received from the air vehicle identifying potential objects of interest for subsequent operator review, determining the geographic location of the object and tracking the object's location; i. said image management unit being connected to a display and control interface constructed to visually display images from the air vehicle to the operator in real time or store images for subsequent operator review; j. said display and control interface being constructed to allow direct control of the air vehicle, by the operator via the GCU radio uplink.*

* * * * *